March 24, 1936.   R. W. CUSHMAN ET AL   2,035,263
VOLUME CONTROL SYSTEM
Filed May 26, 1933
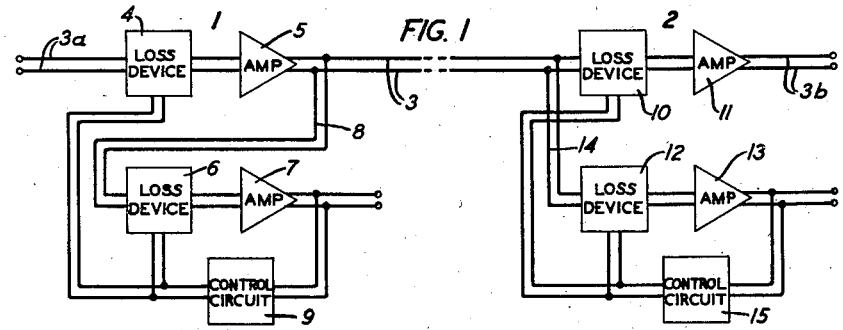
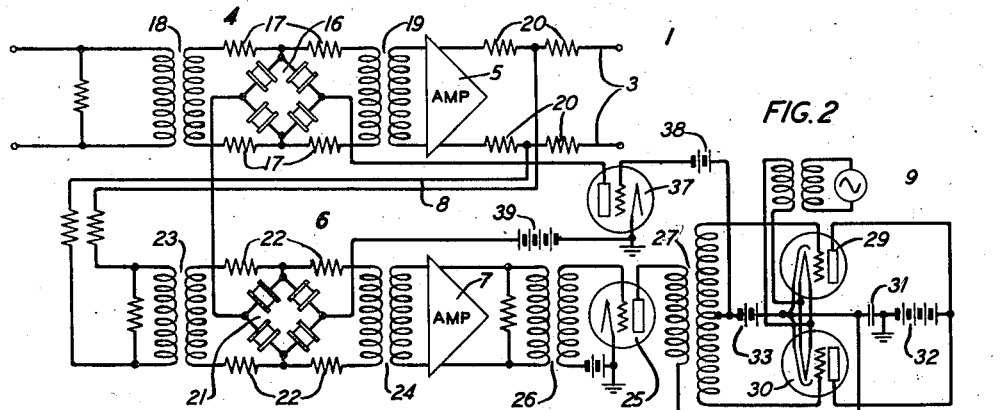
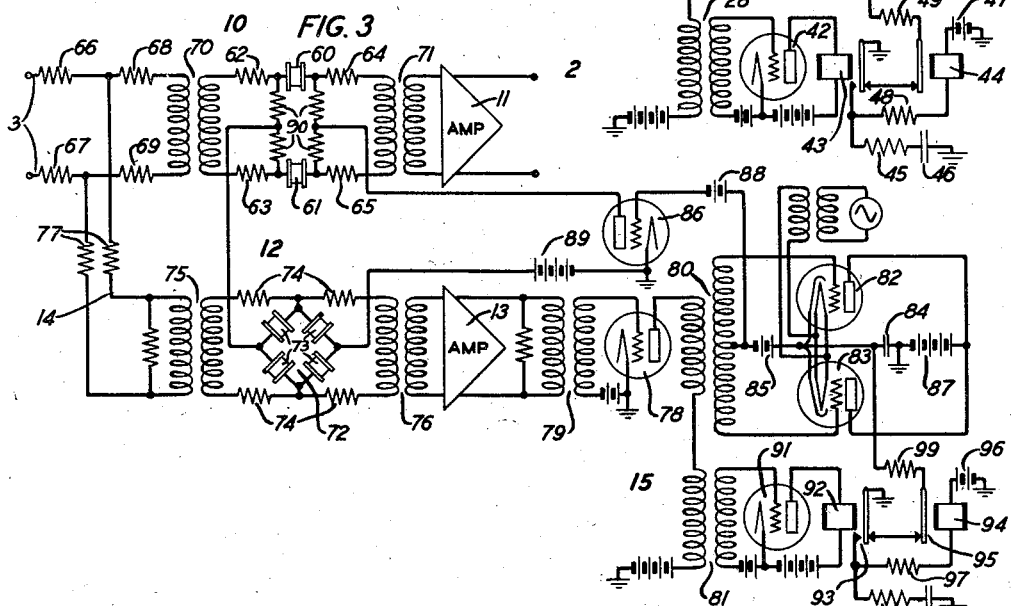
INVENTORS R. W. CUSHMAN
H. E. HILL
Wayne B Wells
ATTORNEY Patented Mar. 24, 1936

2,035,263

UNITED STATES PATENT OFFICE 2,035,263

VOLUME CONTROL SYSTEM

Robert W. Cushman, Summit, and Henry E. Hill, East Orange, N. J., assignors to Bell Telephone Laboratories, Incorporated, New York, N. Y., a corporation of New York Application May 26, 1933, Serial No. 672,964

16 Claims. (Cl. 178—44)

This invention relates to volume control systems and particularly to volume control systems that govern the energy volume range of signals at different points on a transmission line.

One object of the invention is to provide a volume control system that shall govern the energy volume range of signals on a transmission line in an improved manner under the control of a material having a non-linear resistance characteristic.

Another object of the invention is to provide a volume control system that shall compress the energy volume range of the signals at one end of a transmission line under the control of a material having a non-linear resistance characteristic and that shall expand the energy volume range of the signals at the other end of the transmission line to the original volume range under the control of a material having a non-linear resistance characteristic.

A further object of the invention is to provide a volume control system that shall compress the energy volume range of signals to a fixed fraction of the received volume at one end of a transmission line under the control of a material having a non-linear resistance characteristic and that shall expand the energy volume range of the signals to the original range at the other end of the transmission line under the control of a material having a non-linear resistance characteristic.

In the transmission of many signals having a wide range of volume over a line, trouble is often encountered because of overload of the apparatus on the line and because of the noise on the line. The present invention provides means for reducing the energy volume range of the signals or music at the transmitting end of a line and for restoring the signals or music to the original volume range at the receiving end of the line. The reduction of the volume range at the transmitting end of the line and the expansion of the volume range at the receiving end of the line is effected by means of a material composed of silicon carbide crystals and a binder material which has a non-linear resistance characteristic and which may be called a non-ohmic resistance material. Material of this type having a non-linear resistance characteristic is disclosed in the patent to K. B. McEachron 1,822,742, dated September 8, 1931.

In the patent to S. Doba 1,854,828, dated April 19, 1932 is disclosed a volume control system of the type employed to describe the present invention. In the present invention a material composed of silicon carbide crystals and a binder material is employed for compressing and for expanding the energy volume range to materially reduce the transient time and to enable the handling of a much wider range of volumes.

In a volume control system constructed in accordance with the present invention a so-called volume reducer is provided at the transmitting end of a line and a restorer or an expander is provided at the receiving end of the line. The reducer and the restorer may be used together in one system or may be used separately. The reducer and the restorer are used together when signals of a wide volume range are transmitted over a line which will pass only signals having a limited range. With the aid of the reducer, signals and music with a very wide volume range can be recorded either on phonograph record material or on a film and such recorded signals can, upon reproduction, be restored to the original volume range by means of the restorer. In cases where it is not necessary to have the output signal an exact replica of the input signal the reducer or the restorer may be used alone. The reducer alone may be used for recording speech or music for power studies since frequently the full range of volume can not be recorded by an oscillograph. The restorer alone may be used to increase the volume range of signals or music making the loud parts louder without changing the quiet parts.

In the volume control system employed to describe the invention, the reducer at the transmitting end of the line reduces or compresses the volume range to a fixed fraction of the original volume range. The restorer, at the receiving end of the line, expands or restores the energy volume received over the line to the original volume range. In the system shown on the drawing, the volume range measured in decibels is reduced one-half at the transmitting end of the line and is doubled or restored to the original volume range at the receiving end of the line.

The reducer at the transmitting end of the line essentially consists of a variable loss device and an amplifier in the line circuit. The loss device consists of an H-type network, the shunt element of which is a Wheatstone bridge comprising elements composed of silicon carbide crystals and a binder material having two opposite vertices connected across the line circuit. The impedance of the Wheatstone bridge connected across the line is controlled by supplying a variable direct current to the other two vertices thereof. A branch circuit is connected to the transmission line beyond the loss device and the amplifier therein. A loss device and an amplifier similar to the loss device and amplifier connected to the transmission line is connected to the branch circuit. The bridge circuit having arms composed of said elements and connected across the branch circuit is controlled in the same manner as the bridge circuit connected across the transmission line. The two loss devices are so governed by a control circuit as to maintain constant volume on the branch circuit beyond the amplifier therein. Inasmuch as the two loss devices are similar in construction and operation, the volume range of the signals on the transmission line beyond the amplifier therein will be reduced to one-half the range of the volume input to the reducer.

The control circuit for governing the bridge circuits in the transmission line and the branch circuit consists of an amplifier connected to the branch circuit beyond the amplifier therein and at the point where constant volume is maintained. The amplifier controls the operation of two rectifiers. One of the rectifiers comprises two three-element rectifier tubes in push-pull relationship having a control condenser in the plate circuit. The control condenser in the plate circuit of the rectifier tubes has a charge impressed thereon in accordance with the peaks of the signals on the transmission line. The charge on the control condenser governs the current flow through a direct current amplifier. The direct current amplifier is in circuit with the bridge circuits connected across the transmission line and the branch circuit. The impedance of the bridge circuits is thus controlled in accordance with the charge on the control condenser. If the charge on the condenser is raised, the current flow through the bridge circuits is raised to lower the impedance of the bridge circuits and thus increases the loss on the transmission line and on the branch circuit.

The second rectifier connected to the amplifier at the end of the branch circuit controls the operation of two relays. The first relay is quick acting and quick releasing. The second relay is quick acting but slow releasing. The time of release of the second relay is controlled and serves to vary the time of discharge of the control condenser when there is a decrease in the energy volume range of the signals received by the reducer. The two armatures of the relays when in released position complete a grounded circuit through a resistance element and the control condenser. The two armatures of the relays are in series and it is necessary for both relays to be released before the charge of the control condenser can be decreased. Thus in the reducer above described when the input volume increases a charge accumulates on the condenser to reduce the impedance of the bridge circuits and thus increase the loss effect by the loss device in the transmission line and by the loss device in the branch circuit. If the volume is reduced the two relays serve to complete a circuit for lowering the charge on the control condenser and thus increase the impedance of the bridge circuits and reduce the loss caused on the transmission line and on the branch circuit.

Although only one loss device is shown in the transmission line and one loss device is shown in the branch circuit it is apparent that any number of loss devices may be employed in the transmission line and in the branch circuit to effect different fractional reductions of the volume range transmitted over the line. If one loss device were placed in the transmission line and two loss devices were placed in the branch circuit it is apparent that the volume range transmitted over the line would be reduced to two-thirds of the volume range received by the reducer.

The restorer at the receiving end of the transmission line comprises a loss device and an amplifier in the transmission line. A branch circuit having a loss device and an amplifier is connected to the transmission line adjacent to and before the loss device in the line. A control circuit similar to the control circuit employed in the reducer is provided for controlling the loss device in the transmission line and the loss device in the branch circuit. The loss device in the transmission line comprises elements composed of silicon carbide crystals and a binder material connected in series with the line. The loss device in the branch circuit is similar to the loss devices employed in the reducer and comprises a bridge circuit having arms of elements composed of silicon carbide crystals and a binder material connected across the branch circuit. The control circuit governs the current flow through said elements in series with the transmission line and through the bridge circuit across the branch circuit to maintain constant volume on the branch circuit beyond the amplifier therein, and hence to restore the volume range beyond the restorer to the original volume range supplied to the reducer. The volume range received by the restorer is one-half the volume range supplied to the reducer. This volume range received by the restorer is doubled by the loss device and amplifier in the line to produce a volume range beyond the restorer having the same range as the signals received by the reducer. The loss device and the amplifier in the branch circuit of the restorer act in an opposite manner to the loss device and amplifier in the line circuit as is necessary to produce constant volume on the branch circuit beyond the amplifier therein.

Figure 1 in the accompanying drawing is a diagrammatic view indicating the position of the various elements of the reducer and the restorer with respect to the transmission line;

Fig. 2 is a diagrammatic view of a range reducer constructed in accordance with the invention; and Fig. 3 is a diagrammatic view of a range restorer constructed in accordance with the invention.

Referring to Fig. 1 of the drawing, a volume range reducer 1 and a volume range restorer 2 are shown connected to a transmission line 3 having input conductor 3a and output conductors 3b. The volume range reducer 1 which is connected to the transmitting end of the line 3 comprises a loss device 4 and an amplifier 5 in the transmission line and a loss device 6 and an amplifier 7 connected in a branch circuit 8 joined to the transmission line 3 at a point beyond the amplifier 5. The loss devices 4 and 6, respectively, in the transmission line and the branch circuit are governed by control means or a control circuit 9 for maintaining constant volume on the branch circuit beyond the amplifier 7 therein and for reducing the volume range on the transmission line 3 beyond the amplifier 5 to one-half the volume range supplied to the reducer.

The volume range restorer 2 shown connected to the receiving end of the line 3 comprises a loss device 10 and an amplifier 11 connected in the transmission line and a loss device 12 and an amplifier 13 connected to a branch circuit 14 joined to the transmission line before and adjacent to the loss device 10. The loss devices 10 and 12, respectively, in the transmission line and in the branch circuit are governed by a control circuit or control means 15 to maintain constant volume on the branch circuit beyond the amplifier 13 therein and to expand the received signals on the line to the original volume range of the signals supplied to the reducer at the transmitting end of the line. The loss devices 10 and 12 act in opposite manner upon the signals received over the transmission line as is necessary to produce constant volume beyond the amplifier 13 in the branch circuit and to restore the received signals on the line to the original volume range.

Referring to Fig. 2 of the drawing, the loss device 4 in the reducer is shown comprising a Wheatstone bridge circuit 16 having four arms composed of a material having a non-linear resistance characteristic, such as elements composed of silicon carbide crystals and a binder material. Two opposite vertices of the bridge circuit are connected across the line symmetrically with respect to four resistance elements 17. A transformer 18 supplies the received signals to the loss device 4 and a transformer 19 connects the loss device to the amplifier 5. The amplifier 5 may be of any suitable type and preferably is of the electron space discharge type.

The branch circuit 8 in the reducer is connected to the transmission line 3 beyond the amplifier 5 and symmetrically with respect to resistance elements 20 in the transmission line. The loss device 6 in the branch circuit 8 is similar in construction to the loss device 4 in the transmission line and comprises a bridge circuit 21 having arms formed of elements composed of silicon carbide crystals and a binder material and having two opposite vertices thereof connected to the branch circuit symmetrically with respect to four resistance elements 22. A transformer 23 is provided in the branch circuit before the loss device 6 and a transformer 24 is provided for connecting the loss device to the amplifier 7.

The control circuit 9 comprises an amplifier 25 which is connected to the branch circuit 8 beyond the amplifier 7 by means of a transformer 26. The amplifier 25 is connected to two rectifier circuits by transformers 27 and 28. The rectifier circuit connected to the transformer 27 comprises two rectifier tubes 29 and 30 of the three-element type connected in push-pull relationship. In the plate circuit of the rectifier tubes 29 and 30 is provided a control condenser 31 which governs the operation of the loss devices 4 and 6 in the transmission line 3 and the branch circuit 8. A battery 32 supplies plate potential to the rectifier tubes 29 and 30 and a battery 33 supplies negative bias to the grids of the rectifier tubes 29 and 30. The negative side of the battery 32 and the control condenser 31 are grounded for completing a control circuit as will be hereinafter described.

The charge on the control condenser 31 governs the operation of a three-element amplifier tube 37. Negative bias for the grid of the tube 37 is supplied by the batteries 33 and 38. Plate potential for the tube 37 is supplied by a battery 39. In series with the output circuit of the tube 37 are connected the two bridge circuits 16 and 21, connections being made to the vertices of the bridge circuits not connected respectively to the line 3 and the branch circuit 8. The control circuit for the tube 37 may be traced from the grid of the tube through the batteries 38 and 33, control condenser 31 and ground return to the filament of the tube 37. Thus the current flow through the tube 37 is governed in accordance with the charge of the control condenser 31. The current flow through the tube 37 controls the impedance of the bridge circuits 16 and 21.

The second rectifier circuit which is connected to the amplifier 25 by the transformer 28 comprises a three-element rectifier tube 42. A relay 43 is connected in the rectifier output circuit. The relay 43 is quick acting and quick to release and controls a relay 44 which is quick acting but is slow to release. The time of release of the relay 44 is controlled by a resistance element 45 and a condenser 46 which are connected by a ground circuit across the energizing coil for the relay 44 and an operating battery 47. The operating circuit for the relay 44 extends from the armature of the relay 43, resistance 48, coil of the relay 44, battery 47 and ground return to the armature of relay 43. When the armature of the relay 43 breaks the operating circuit for the relay 44, the charging of the condenser 46 holds the relay 44 in an operated position for a predetermined length of time. The length of time the relay 44 is held operated may be controlled by varying the size of the resistance element 48 and the condenser 46. The armatures of the relays 43 and 44 when in a released position establish a ground circuit through a resistance element 49 for discharging the control condenser 31.

If the volume of the input signals to the reducer shown in Fig. 2 is suddenly increased the volume on the branch circuit 8 beyond the amplifier 7 will tend to rise. This will cause a current to flow through the charging circuit for the condenser 31. At this time the relays 43 and 44 will be operated so that the condenser 31 may be charged to any desired degree. The effect of the increased charge on the control condenser 31 will be to decrease the bias on the grid of the tube 37 and, therefore, to increase the plate current flow through the tube. The increased current flow through the tube 37 also flows through the elements comprising the bridge circuits 16 and 21. Increasing the current flow through the elements comprising the arms of the bridge circuits 16 and 21 lowers the resistance of the material composed of silicon carbide crystals and a binder material and, hence, increases the loss effected by the loss devices 4 and 6. The added loss caused by the loss devices 4 and 6 serves to lower the volume at the output of the reducer 1 and to hold constant energy volume on the branch circuit 8 beyond the amplifier 7. When the correct volume is effected on the branch circuit 8 beyond the amplifier 7 the charge on the condenser 31 will remain constant. The total time taken for effecting the change in the volume in case of an increased volume supplied to the reducer is of the order of four thousandths of a second. During this time there will be some distortion in the output wave form but this time is so short as not to be noticeable.

If the volume range of signals supplied to the reducer is suddenly reduced the volume on the branch circuit 8 beyond the amplifier 7 will drop. The reduction in the output current of amplifier 25 reduces the current flow through the rectifier 42, which in turn causes the release of the armature of the relay 43. About a second after the release of the relay 43 the relay 44 will be released.

When the relays 43 and 44 are both released a discharge path for the control condenser 31 is provided through the resistance element 49. The resistance 49 serves to effect a gradual discharge of the condenser. During the discharge of the condenser 31 the bias on the grid of the tube 37 will increase so that the plate current through the tube and the material composed of silicon carbide crystals and a binder material will decrease. This results in an increased resistance of the arms forming the bridge circuits 16 and 21. The increased resistance of the bridge circuits 16 and 21 serves to raise the volume on the line beyond the reducer 1 and to raise the volume on the branch circuit 8 beyond the amplifier 7 until constant volume is obtained on the branch circuit. When the proper volume is obtained on the branch circuit 8 beyond the amplifier 7 the relays 43 and 44 will again be operated to prevent further discharge of the condenser 31.

The range restorer 2 shown in Fig. 3 of the drawing has an action which is the inverse of the action of the range reducer 1 shown in Fig. 2 of the drawing. The loss element 10 of the range reducer 2 comprises elements 60 and 61 which are connected in series with the transmission line and are symmetrically placed with respect to resistance elements 62, 63, 64, and 65. The branch circuit 14 is connected to the line 3 before the loss device 10 and symmetrically with respect to resistance elements 66, 67, 68, and 69. A transformer 70 is provided in the line between the resistance elements 68 and 69 and the resistance elements 62 and 63. A transformer 71 is provided in the line between the resistance elements 64 and 65 and the amplifier 11. The amplifier 11 is preferably similar to the amplifiers 5 and 7 employed in the range reducer 1.

The loss element 12 inserted in the branch circuit 14 comprises a bridge circuit 72 having arms comprised of elements 73 composed of silicon carbide crystals and a binder material. Two opposite vertices of the bridge circuit 72 are connected across the branch circuit symmetrically with respect to resistance elements 74. A transformer 75 is inserted in the branch circuit ahead of the loss device 12 and a transformer 76 is provided in the branch circuit between the loss device 12 and the amplifier 13. The amplifier 13 is preferably similar in construction to the amplifier device 11 in the transmission line 3 and associated with the loss device 10. Resistance elements 77 are inserted in the branch circuit 14 ahead of the loss device 11.

Control means or control circuits 15 similar to control circuits 9 in the range reducer are provided for controlling the operation of the loss device 10 in the main line and the loss device 12 in the branch circuit 14. The control circuits 15 comprise an amplifier 78 which is connected to the end of the branch circuit 14 by means of a transformer 79. The amplifier 78 is connected to two rectifier circuits by means of transformers 80 and 81. The first rectifier circuit comprises two three-element space discharge rectifiers 82 and 83 which are connected in push-pull relationship. The output circuit of the rectifiers 82 and 83 includes a control condenser 84 which is similar in operation to the control condenser 31 in the range reducer. A battery 85 is provided for supplying grid bias not only to the rectifier tubes 82 and 83 but also to a three-element tube 86 which controls the current in the elements of the loss devices 10 and 12. A battery 87 is provided for supplying plate potential to the rectifier tubes 82 and 83. A battery 88 also is provided for supplying bias to the grid of the tube 86. A grounded circuit including the control condenser 84 serves to control the operation of the tube 86 according to the charge on the control condenser 84.

A battery 89 is provided for supplying plate potential to the tube 86. The output circuit of the tube 86 is connected in series with the elements 60 and 61 composed of silicon carbide crystals and a binder material in the loss device 10 by means of resistance elements 90 and is connected to the vertices of the bridge circuit 72 which are not connected across the branch circuit 14. The loss devices 10 and 12 operate in an opposite manner. An increased current flow through the tube 86 will increase the loss effected by the loss device 12 and decrease the loss effected by the loss device 10. A decrease in the current flow through the tube 86 will decrease the loss effected in the loss device 12 and increase the loss effected in the loss device 10.

The second rectifier circuit connected to the amplifier 78 at the end of the branch circuit 14 comprises a three-element rectifier tube 91 which is connected in circuit with a quick acting and quick releasing relay 92 having an armature 93. The relay 92 controls a relay 94 which is quick acting and slow releasing. The relay 94 is provided with an armature 95. When the armature 93 is operated by the relay 92 a circuit is completed from a battery 96 for operating the relay 94. A resistance element 97 is included in this circuit. The armatures 93 and 95 of the relays 92 and 94 complete a circuit through a resistance element 99 for controlling the discharge of the control condenser 84. A resistance element 100 and a condenser 101 are connected across the relay 94 and the battery 96 for controlling the time of release of the relay 94.

The loss device 10 in the transmission line 3 is governed by the control circuits 15 to restore the volume range of the line 3 beyond the amplifier 11 to the original volume range of the signals supplied to the range reducer 1. The control circuits 15 also govern the loss device 12 in the branch circuit 14 to maintain constant volume on the branch circuit 14 beyond the amplifier 13. The control circuits 15 are governed in the same manner as the control circuits 9 connected to the branch circuit 8 of the range reducer and a detailed description of the operation of the circuits 15 is deemed unnecessary.

If signals of high volume range have been supplied to the range reducer 1 shown in Fig. 2 of the drawing such signals have their volume reduced one-half before transmission over the line to the range restorer 2 shown in Fig. 3 of the drawing. The loss device in the branch circuit 14 lowers the gain of such signals one-half in order to maintain constant volume on the branch circuit 14 beyond the amplifier 13. However, the loss device in the line 3 doubles the gain on the transmission line in order to expand the received signals to the original range of the signals as received by the range reducer 1. The control condenser 84 has a charge impressed thereon to increase the current flow through the tube 86. The increased current flow through the tube 86 increases the current flow through the elements 60 and 61 to lower the loss effected by the loss device 10 in the transmission line and at the same time the increased current flow through the tube 86 increases the loss effected by the loss device 12 in the branch circuit 14. In case signals having a reduced volume are received by the range reducer 1 said signals will be transmitted to the range restorer 2 with their volume increased one-half. The volume restorer then operates to increase the loss effected by the loss device 10 so that the volume of the signals beyond the amplifier 11 is the same as the volume of the signals supplied to the reducer and to lower the loss effected by the loss device 12 in the branch circuit so that constant volume may be maintained on the branch circuit 14 beyond the amplifier 13. The expression "fixed percent of the energy volume" when used in the claims with respect to the expansion or compression of signals is intended to mean that the signal waves are expanded or compressed so that the volume of the signals after expansion or compression bears a fixed ratio with respect to the volume of the signals before expansion or compression.

Modifications in the system and in the arrangement and location of parts may be made within the spirit and scope of the invention and such modifications are intended to be covered by the appended claims.

What is claimed is:

1. In combination, a transmission line, control means comprising elements composed of silicon carbide and a binder material connected across said line at the transmitting end thereof and means automatically operated according to the volume range of the signals for governing said control means to reduce the energy volume range of the signals of variable range transmitted over the line a fixed percent of the energy volume range of the received signals.

2. In combination, a transmission line, control means comprising elements composed of silicon carbide and a binder material having a non-linear resistance characteristic connected in series with said line at the receiving end thereof, and means for automatically governing said control means according to the volume range of the signals received at the receiving end of the line to expand the energy volume range of the signals on said line a fixed percent.

3. In combination, elements composed of silicon carbide crystals and a binder material connected to a transmission line at the transmitting end thereof, means for automatically controlling said elements according to the volume range of the signals to vary the impedance of said elements and reduce the energy volume range of the signals transmitted over said line, control means comprising elements composed of silicon carbide crystals and a binder material connected to the transmission line at the receiving end thereof, and means for automatically governing said control means according to the volume range of the signals transmitted over the line to vary the impedance of said elements at the receiving end of the line and expand the energy volume range of the signals received over the transmission line.

4. In combination, a transmission line, control means at the transmitting end of said line comprising a material having a non-linear resistance characteristic connected across the line, means for automatically governing said control means according to the volume range of the signals to reduce the energy volume range of the signals transmitted over the line a fixed percent of the energy volume range of the received signals, control means at the receiving end of the transmission line comprising a material having a non-linear resistance characteristic connected in series with the line, and means for automatically governing said control means at the receiving end of the line according to the volume range of the signals received at the receiving end of the line to expand the energy volume range of the signals received over the line to the original energy volume range of the signals received at the transmitting end of the line.

5. In combination, a transmission line, elements of a material having a non-linear resistance characteristic forming the arms of a bridge circuit having two opposite vertices thereof connected across said line at the transmitting end thereof, and means connected to the other two vertices of said bridge circuit for supplying current to the bridge to vary the operating resistance of said elements and reduce the energy volume range of all signals of variable volume range on the line beyond the bridge circuit a fixed percent of the energy volume range of the received signals.

6. In combination, a transmission line, elements of a material having a non-linear resistance characteristic forming the arms of a bridge circuit having two opposite vertices thereof connected across said line at the transmitting end thereof, a branch circuit connected to said line beyond said bridge circuit, a second bridge circuit similar in construction to the first mentioned bridge circuit and connected across said branch circuit, and means connected to said branch circuit beyond the bridge circuit for controlling said bridge circuit to maintain constant energy volume on the branch circuit beyond the bridge and to reduce the energy volume range of the signals on the line beyond the bridge circuit therein a fixed percent of the energy volume range of the received signals.

7. In combination, a transmission line, elements of a material having a non-linear resistance characteristic connected in series with said line at the receiving end thereof, and means connected in circuit with said elements for transmitting a direct current through the elements to expand the volume range of the signals on the line beyond said elements.

8. In combination, a transmission line, elements of a resistance material having a non-linear resistance characteristc connected in series with said line at the receiving end thereof, a branch circuit connected to said line before and adjacent to said elements, elements of a resistance material having a non-linear resistance characteristic forming the arms of a bridge circuit having two opposite vertices thereof connected across said branch circuit, and means connected to said branch circuit beyond said bridge for transmitting a direct current through said element in the line to expand the volume range of the signals on the line beyond the elements and for passing direct current through said bridge to maintain constant volume on the branch circuit beyond the bridge.

9. In combination, a transmission line, a loss device comprising a material having a non-linear resistance characteristic connected across said line at the transmitting end thereof, a branch circuit connected to said line beyond said loss device, a second loss device comprising a material having a non-linear resistance characteristic connected across said branch circuit, and means connected to said branch circuit beyond the loss device therein for controlling said loss devices to maintain the volume constant on the branch circuit beyond the loss device therein and to reduce the volume range of the signals on the transmission line.

10. In combination, a transmission line, a loss device comprising a material having a non-linear resistance characteristic connected in series with said line at the receiving end thereof, a branch circuit connected to said line before and adjacent to the loss device therein, a second loss device comprising material having a non-linear resistance characteristic connected across said branch circuit, and means connected to said branch circuit beyond the loss device therein for controlling said loss devices to maintain constant volume on the branch circuit beyond the loss device therein and to extend the volume range of the signals on said line beyond the loss device therein.

11. In combination, a transmission line, elements composed of silicon carbide crystals and a binder material forming the arms of a bridge circuit having two opposite vertices thereof connected across said line, a branch circuit connected to said line beyond the bridge circuit, a bridge circuit similar to the bridge connected to the line connected across said branch circuit, rectifying means for supplying direct current to the vertices of the first mentioned bridge which are not connected to the line and to the vertices of the second mentioned bridge which are not connected to the branch circuit, and control means connected to the branch circuit beyond the bridge therein for governing said rectifying means to control said bridge circuits and maintain constant energy volume on the branch circuit beyond the bridge and a reduction of the energy volume range of the signals on the line beyond the bridge therein a fixed percent of the energy volume range of the received signals.

12. In combination, a transmission line, elements composed of silicon carbide crystals and a binder material connected in series with said line at the receiving end thereof, a branch circuit connected to said line before and adjacent to said elements, a bridge having the arms thereof formed of elements composed of silicon carbide crystals and a binder material and having the opposite vertices thereof connected across said branch circuit, rectifying means for supplying direct current to a circuit passing through said elements in the line and connected to the vertices of said bridge which are not connected to the branch circuit, and control means connected to the branch circuit beyond the bridge therein for governing said rectifying means to control said bridge and maintain constant energy volume on the branch circuit beyond said bridge and to control said elements in the line to expand the energy volume range of the received signals a fixed percent.

13. In combination, a transmission line, a loss device comprising a material having a non-linear resistance characteristic connected across said line at the transmitting end thereof, a second loss device comprising a material having a non-linear resistance characteristic connected across a branch circuit joined to said line beyond said first mentioned loss device, means connected to said branch circuit beyond the loss device therein for controlling said loss devices to maintain the energy volume on the branch line beyond the loss device constant and to reduce the energy volume range of the signals on the line beyond the first mentioned loss device, a third loss device comprising a material having a non-linear resistance characteristic connected in series with said line at the receiving end thereof, a second branch circuit connected to the line before and adjacent to the third loss device, a fourth loss device comprising a material having a non-linear resistance characteristic connected across said second branch circuit, and means connected to said second branch circuit beyond the loss device therein for controlling said third and fourth loss devices to maintain constant energy volume on the second branch circuit beyond the loss device therein and to restore the energy volume range of the signals on the line at the receiving end thereof to the original volume range.

14. In combination, gain control means comprising elements composed of silicon carbide crystals and a binder material arranged in the form of a bridge circuit and connected across a transmission line, and means for automatically transmitting direct current through said elements according to the volume range of received signals to vary the impedance of said elements and control the volume range of the signals on the line.

15. In combination, a transmission line, control means comprising elements composed of silicon carbide crystals and a binder material arranged in the form of a bridge circuit and connected across said transmission line, and means for automatically transmitting direct current through said elements according to the volume range of received signals to vary the impedance of said elements and reduce the energy volume range of the signals transmitted over the line.

16. In combination, a transmission line, control means comprising elements composed of silicon carbide crystals and a binder material connected to said transmission line at the receiving end thereof, and means for automatically transmitting direct current through said elements according to the volume range of the signals received over the line to vary the impedance of said elements and expand the energy volume range of the received signals.

ROBERT W. CUSHMAN.
HENRY E. HILL.